United States Patent
Gong

(10) Patent No.: US 10,417,650 B1
(45) Date of Patent: Sep. 17, 2019

(54) DISTRIBUTED AND AUTOMATED SYSTEM FOR PREDICTING CUSTOMER LIFETIME VALUE

(71) Applicant: Google Inc., Mountain View, CA (US)

(72) Inventor: Xiaohong Gong, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 956 days.

(21) Appl. No.: 14/959,494

(22) Filed: Dec. 4, 2015

(51) Int. Cl.
*G06Q 30/02* (2012.01)

(52) U.S. Cl.
CPC ................. *G06Q 30/0202* (2013.01)

(58) Field of Classification Search
CPC .................................................. G06Q 30/0202
See application file for complete search history.

(56) References Cited

U.S. PATENT DOCUMENTS

| | | | |
|---|---|---|---|
| 2004/0015386 A1* | 1/2004 | Abe ................. | G06Q 10/06375 705/7.29 |
| 2014/0289007 A1* | 9/2014 | Bhattacharya ..... | G06Q 30/0202 705/7.31 |
| 2017/0061480 A1* | 3/2017 | Zhou ................. | G06Q 30/0254 |

FOREIGN PATENT DOCUMENTS

CA          2845421 A1 *  9/2014  ......... G06Q 30/0204

OTHER PUBLICATIONS

S.L. Chan et. al, "A model for predicting customer value from perspectives of product attractiveness and marketing strategy," Mar. 2010, Expert Systems with Applications, vol. 27, Issue 2, pp. 1207-1215 (Year: 2010).*
"Smart" design space sampling to predict Pareto-optimal solutions. Zuluaga et al.
A modified Pareto/NBD approach for predicting customer lifetime value. Glady et al.
Automated Training for Algorithms That Learn from Genomic Data. Cilingir et al.
Benchmarking pareto archiving heuristics in the presence of concept drift: diversity versus age. Atwater et al.
Distributed Pareto Optimization via Diffusion Strategies. Chen.

* cited by examiner

*Primary Examiner* — Amanda Gurski
(74) *Attorney, Agent, or Firm* — Foley & Lardner LLP

(57) ABSTRACT

Systems, methods, and computer-readable storage media for distributed and automated prediction of future customer revenue are provided. One method involves accessing data structures, each representing a unique customer, storing a set of customer-specific characteristics, segregating the data structures into groups based on a target amount of data structures for each group, and inputting the customer-specific characteristics into a training model. The method includes generating a set of prediction model parameters for each group by applying the customer-specific characteristics to a training model. The method includes transforming the characteristics of each data structure in a first group into respective future revenue values using a first non-linear prediction model, and the characteristics of data structures in a second group into respective future revenue values using a second prediction model. A portion of the future revenue values for the groups is calculated in parallel, and the calculated values are stored in a memory.

20 Claims, 7 Drawing Sheets

DISTRIBUTED AND AUTOMATED SYSTEM FOR PREDICTING CUSTOMER LIFETIME VALUE

BACKGROUND

Content providers often publish content items in networked resources through online content management systems with the goal of having an end user interact with (e.g., click through) the content items and perform a converting action, such as providing information of value to the content providers and/or purchasing a product or service offered by the content providers. The long-term goal of content providers is often to establish continuing, profitable relationships with customers over a long period of time. The types of interactions users have with resources associated with a content provider can impact the value of the relationship with the customers over time. Some interactions may increase the likelihood that a customer will continue to make purchases from a content provider over a long period of time, while other interactions may dissuade a customer from long-term interaction with a content provider. Prediction modeling can help determine how profitable a relationship with a customer is likely to be over time.

SUMMARY

One illustrative implementation of the disclosure relates to a method that involves accessing a plurality of data structures, each data structure representing a unique customer and storing a set of customer-specific characteristics including a time of customer acquisition, segregating the plurality of data structures into a plurality of groups based on the stored customer acquisition times and responsive to a target amount of data structures for each group, and inputting the customer-specific characteristics of each of the customers in the groups into a training model. The method further includes generating a set of prediction model parameters for each of the groups by applying the customer-specific characteristics of each of the customers in the groups to a training model. The method further includes transforming, for each of the groups, at least some of the customer-specific characteristics stored by each one of the data structures in the group into a set of prediction model parameters using a training model. The method includes transforming, by at least one first processor, the customer-specific characteristics of each data structure in a first group into a respective future revenue value for each data structure using a first non-linear prediction model based on a first set of prediction model parameters associated with the first group. The method further includes transforming, by at least one second processor, the customer-specific characteristics of each data structure in a second group into a respective future revenue value for each data structure using a second non-linear prediction model based on a second set of prediction model parameters associated with the second group. At least a portion of the future revenue values for the first and second groups is calculated in parallel by the first and second processors. The method finally includes storing data based on the calculated future revenue values in a memory.

Another implementation of the disclosure relates to a system which includes one or more processors which are configured to access a plurality of data structures, each data structure representing a unique customer and storing a set of customer-specific characteristics including a time of customer acquisition. The processors are further configured to segregate the plurality of data structures into a plurality of groups based on the stored customer acquisition times and responsive to a target amount of data structures for each group and input the customer-specific characteristics of each of the customers in the groups into a training model. The processors are further configured to transform, for each of the groups, at least some of the customer-specific characteristics stored by each one of the data structures in the group into a set of prediction model parameters using a training model. At least one first processor is configured to transform the customer-specific characteristics of each data structure in a first group into a respective future revenue value for each data structure using a first non-linear prediction model based on a first set of prediction model parameters associated with the first group. At least one second processor of the one or more processors is configured to transform the customer-specific characteristics of each data structure in a second group into a respective future revenue value for each data structure using a second non-linear prediction model based on a second set of prediction model parameters associated with the second group. At least a portion of the future revenue values for the first and second groups is calculated in parallel by the at least one first processor and the at least one second processor. The processors are finally configured to store data based on the calculated future revenue values in a memory element.

Yet another implementation of the disclosure relates to computer-readable storage media with instructions to cause one or more processors to execute operations including accessing a plurality of data structures, each data structure representing a unique customer and storing a set of customer-specific characteristics including a time of customer acquisition. The operations include segregating the plurality of data structures into a plurality of groups based on the stored customer acquisition times and responsive to a target amount of data structures for each group by restricting the plurality of data structures to data structures representing customers determined to have been acquired as a new customer during a predefined period of time and restricting the plurality of data structures to data structures representing customers determined to have made a transaction during the predefined period of time. The operations further include inputting the customer-specific characteristics of each of the customers in the groups into a training model. The operations include iteratively selecting one of a plurality of test sets of training model parameters, calculating an output value of a likelihood function associated with a training model, and selecting a test set of training model parameters as the prediction model parameters for each group from among the plurality of test sets based on the output values. The operations further include transforming, for each of the groups, at least some of the customer-specific characteristics stored by each one of the data structures in the group into a set of prediction model parameters using a training model. The operations also include transforming, by a first processor, the customer-specific characteristics of each data structure in a first group into a respective future revenue value for each data structure using a first non-linear prediction model based on a first set of prediction model parameters associated with the first group. The operations further include transforming, by a second processor, the customer-specific characteristics of each data structure in a second group into a respective future revenue value for each data structure using a second non-linear prediction model based on a second set of prediction model parameters associated with the second group. At least a portion of the future revenue values for the first and second groups is calculated in parallel by the at least one first processor and the at least one second processor. The operations finally include storing data based on the calculated future revenue values in a memory element.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
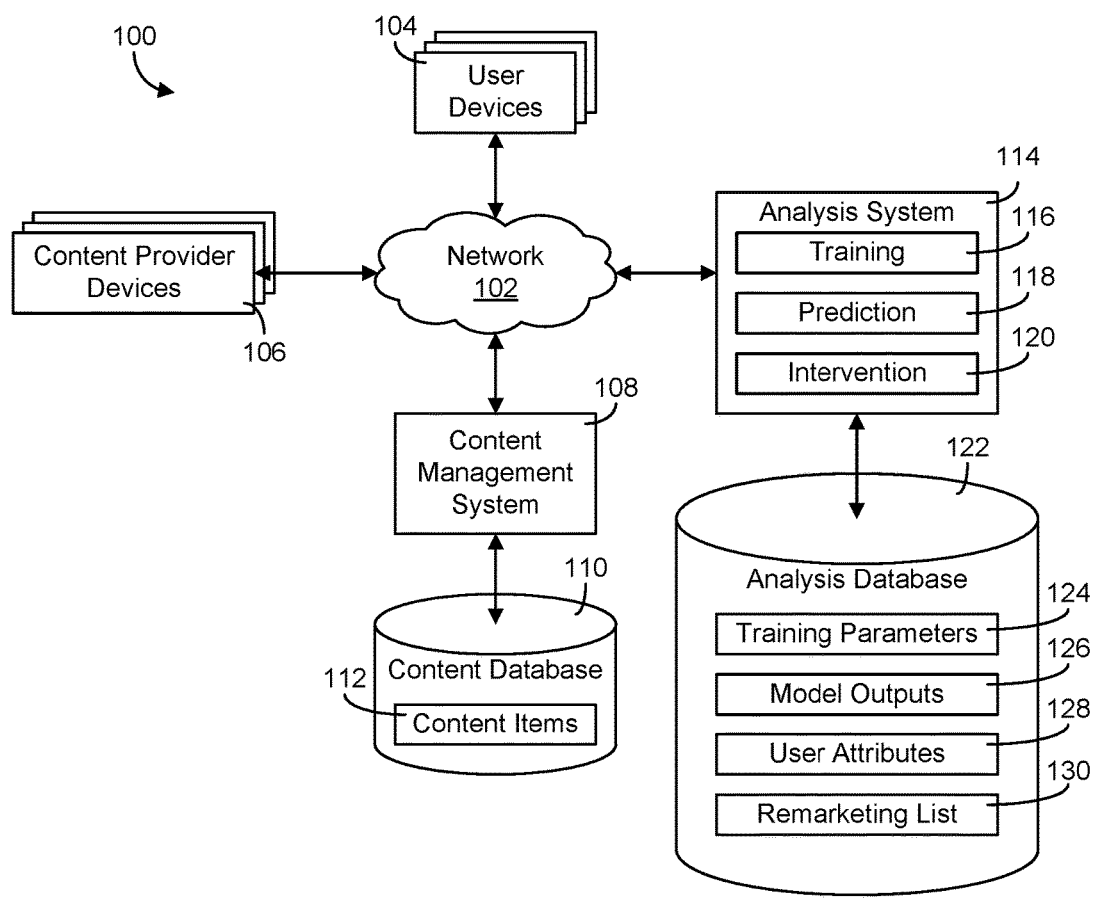
FIG. 1 is a block diagram of an analysis system and associated environment according to an illustrative implementation.

Referring generally to the Figures, various illustrative systems and methods are provided that may be used to provide content providers with information regarding how interactions with users impact an expected future revenue from the user. Future revenue value models may provide an ability to predict the expected future cash flows of a given customer. An illustrative value may be the Customer Lifetime Value (CLV); CLV metrics may be the result of a model that projects future cash flows from a given customer. CLV may represent a relative or absolute economic value (e.g., monetary value) to the content provider of a relationship with a customer over a future time period, in some implementations including, but not limited to, over the lifetime of the relationship with the customer. In some implementations, the cash flows may be discounted to account for predicted changes in the time-value of money (e.g., to account for the fact that a monetary value obtained at some future time, such as five years from a current date, is not as valuable to the content provider as that same value today). In some implementations, CLV metrics may allow a content provider to identify those customers who are likely to generate the most income for the business going forward by looking at previous behavior of the customer and/or previous customers who exhibited similar behavior.

Customers may be segmented based on CLV and/or probability of churn, or turnover. Different targeting and marketing techniques may be applied to different segments: a retention campaign may target high-to-medium CLV customers with high-to-medium churn. Content providers may run upsell or cross-sell campaigns that target all customers with medium-to-low churn. Segments that bring in long-term value to the company can be heavily targeted. Predictions of CLV and probability of churn allow content providers to set budgets for acquiring a particular type of customer, calculate whether a particular deal will be profitable, or make accurate ROI projections. Returns on a campaign calculated using the total profit a customer represents over time, not just profit earned on the first sale, are more representative.

There are a number of predictive CLV models that may be utilized to predict CLV. One of the most practical models is the Buy Till You Die (BTYD), or Pareto/NBD, model that was developed to describe repeat-buying behavior in a non-contractual setting. Despite its accuracy, the Pareto/NBD model is not widely adopted due to the complexity of the model—a data scientist typically manually runs the model on a single machine for a single profile. Further, different training parameters may be used for different businesses, and manual model training and tuning is typically utilized. When a large number of businesses and amount of user data is analyzed, it is difficult to run such a resource-intensive model.

Illustrative implementations of the present disclosure address this challenge by providing a distributed and automated method for calculating CLV and/or probability of churn using a non-linear model. The systems and methods of the present disclosure may provide a practical compromise between accuracy and computing efficiency, improving the operation of the system or systems on which a non-linear prediction model is run, and allowing widespread adoption of accurate, non-linear prediction models.

CLV or lifetime value is a forward looking concept that predicts how much a customer would spend in a business during his or her lifetime. Monitoring the probability of churn and/or probability of remaining active for a customer allows a business to intervene when the customer is about to churn, or turn over. Customers targeted for retention campaigns may have high to medium CLV and high churn probability. Customers targeted for cross sell or up-sell campaigns may have any category of CLV and medium to low churn probability. CLV serves as a metric for both segment level and individual level analysis and use cases. It is generally more accurate to calculate return on a campaign when using the total profit or revenue the customer represents over time in comparison to using just the profit earned on the first sale. Businesses may modify aspects of content campaigns using the calculated CLV, and begin to look beyond cost per acquisition by evaluating content campaigns based on long-term value. Rather than waiting to see how customers behave, a business may be able to immediately evaluate the effects of a decision with predictive CLV models. Some businesses may measure the CLV of new social customers and prioritize social marketing channels—the analysis of CLV reveals just how valuable social media customers are over time. Other businesses may evaluate CLV across ad networks and their affiliates and discover which networks attract the highest value customers to adjust marketing budgets accordingly. CLV may give a business actionable insights (such as churn detection), drive revenue, keep customers coming back, activate members into customers, convert one-time buyers into repeat customers, and win back repeat customers that have faded away.

Any non-linear prediction model may be used to calculate CLV using the methods, systems, and computer-readable storage media described in the present disclosure. As an illustrative example, the Pareto/NBD model may be used. Pareto/NBD is one of the most accurate models for predicting CLV. The model is available in R, a language and software environment for statistical analysis. However, this implementation can only run on a single computer, executes a single model, requires manual data manipulation and parameter tuning by a data scientist, and does not scale well. Other models, such as covariance-based models, may be used, but can take a long time to train, may require a large amount of memory, and are not easily scalable. Alternative models which require less computation power for comparable population sizes include linear regression models; however, these models produce results which are far less accurate.

According to various implementations, the systems and methods of the present disclosure provide techniques for an improved method for estimating CLV or other predictions of future revenue associated with the customers. A population of customers associated with a business, each having a set of characteristics such as a number of transactions made, a transaction location, and previous transaction behavior, is acquired. A plurality of data structures may be generated and correlated with the population of customers. Each data structure may contain customer-specific characteristics such as purchase, location, and customer data. For example, data structures may contain purchase frequencies, times, and amounts; purchase and general location data; and age group, gender, etc. data. The data structures may simplify the process of arranging and categorizing the customers represented by the data structures. The data structures may be segregated into one or more groups; segregation may be based on periods of time, and each period (e.g., acquisition period) may be defined by a start time and an end time. Data structures may be included in respective groups given the associated customer made a first transaction, and thus was newly acquired, during the acquisition period. Additional criteria may be defined for each group, such as the channel through which each customer was acquired, associated verticals, user information, and user location. The acquisition period may be determined automatically based on a number of transactions made by the plurality of data structures during the period. In some implementations, the period is defined as the shortest period of time in which the total number of transactions made by the plurality of data structures containing customer data exceeds a predetermined threshold number of transactions.

Trimming of each group may occur if the number of data structures in a group exceeds a predefined maximum number of data structures. This maximum may be determined based on the predetermined compromise between accuracy of predictions and computation efficiency, in some implementations. For example, a maximum number of data structures representing customers that produces accurate predictions in an acceptable amount of computation time may be 50,000, in some implementations. When a group is determined to include more than 50,000 data structures, a down-sampling (e.g., random down-sampling or down-sampling based on predefined parameters) designed to maintain customer demographic distribution within a predetermined threshold and preserve integrity of results may be executed.

For each group, the customer-specific characteristics of each of the customers can be input to a training parameter selection model. Each group may produce a separate set of training parameters, and thus a different prediction model. Parallel processing of each model may then be implemented, as two or more separate models can be run automatically on a separate machine/processor. In some implementations, multiple processors may calculate a future revenue value for each of the customers in the population using a separate non-linear prediction model for each of the groups. The sets of prediction model parameters used for each model are determined for each group using the sets of separately determined training model parameters for each group. A future revenue value is calculated for each customer in all groups by processing the customer-specific characteristics of each customer contained in the respective data structure in each group using a non-linear prediction model generated using a set of prediction model parameters associated with the particular group.

In some implementations, the method may be broken into different processing pipelines that run automatically without manual intervention. For example, a first pipeline may be the training parameter estimation pipeline; a second pipeline may be a training pipeline; and a third pipeline may be an estimation pipeline. The training parameter estimation pipeline may select users with sufficiently populated attributes, estimate the start and end times for each group, and estimate different training parameters for each business. The training pipeline may train a model for each user group based on new data obtained for the groups, and, in some implementations, may run more frequently than the training parameter estimation pipeline (e.g. monthly or bi-weekly). The estimation pipeline may predict the CLV and/or probability of churn for each customer associated with each business, and, in some implementations, may run more frequently than the other pipelines (e.g., daily). Each step of the method may occur automatically and without manual input, in some implementations, streamlining the calculation and analysis of CLV. The systems, methods, and computer-readable media detailed in the present disclosure improve estimation of CLV and/or other future revenue values and the operation of the system on which the calculations are run.

The present disclosure details methods, systems, and computer-readable storage media which improve functioning of the computing system on which analysis system 114 runs. The automation and distribution of the system makes analysis less resource intensive, and reduces the amount of manual input required from a user. By representing customers with data structures which are easily organized, categorized, and manipulated, and dividing the customer base, training the chosen non-linear model can be automated. In various implementations, any appropriate data structure may be used. For example, arrays, queues, linked lists, maps, heaps, trees, etc. may be used to represent customers. The customer base may be split into groups using the data structures, and the model may be trained for each group. The training of multiple models for multiple groups improves model accuracy and allows prediction to be distributed and processed in parallel, resulting in greater efficiency and less computational requirements or stress on an individual system. For example, instead of running prediction on one expensive, high-performance system over a long period of time, in some implementations, training and/or prediction may be accomplished in a shorter timeframe using multiple systems that may be less expensive and have lower processing capabilities.

In some implementations, the system may implement one or more actions based on the effect of the interactions. For example, the system may identify a pattern of interactions that lead to reductions in estimated future value for multiple users. The system may then monitor user paths to determine whether any user interactions match one or more of the interactions associated with reductions in estimated future value. If so, the system may take actions to prevent a reduction in estimated future value, such as adding an identifier associated with the user device to a remarketing list 130.

In some implementations, the system may use the future revenue impact values of the interactions to modify bid values. For example, the system may apply bid multipliers to content items increasing or decreasing bids for presenting those items to users based on whether interactions with those content items are estimated to increase or decrease the estimated future value associated with users. In some implementations, the system may make bid adjustments based on prior interactions associated with a user device to which content items are being presented. For example, if interactions associated with a user device indicate the user previously interacted with content that tends to reduce the estimated future value of users, a bid to present additional content items may be increased in an effort to avoid or counteract the reduction in future value.

For situations in which the systems discussed herein collect and/or utilize personal information about users, or may make use of personal information, the users may be provided with an opportunity to control whether programs or features that may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

For situations in which the systems discussed herein collect and/or utilize information pertaining to one or more particular content providers, the content providers may be provided with an opportunity to choose whether to participate or not participate in the program/features collecting and/or utilizing the information. In some implementations, the information may be anonymized in one or more ways before it is utilized, such that the identity of the content provider with which it is associated cannot be discerned from the anonymized information. Additionally, data from multiple content providers may be aggregated, and data presented to a content provider may be based on the aggregated data, rather than on individualized data. In some implementations, the system may include one or more filtering conditions to ensure that the aggregated data includes enough data samples from enough content providers to prevent against any individualized content provider data being obtained from the aggregated data. The system does not present individualized data for a content provider to any other content provider.

Referring now to FIG. 1, and in brief overview, a block diagram of an analysis system 114 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, bids for content to be selected by content management system 108 may be provided to content management system 108 from content providers participating in an auction using devices, such as content provider devices 106, configured to communicate with content management system 108 through network 102. In such implementations, content management system 108 may determine content to be published in one or more content interfaces of resources (e.g., webpages, applications, etc.) shown on user devices 104 based at least in part on the bids.

An analysis system 114 may be configured to analyze data relating to interactions of one or more users of user devices 104 and estimate an impact of the interactions on the future revenue value of customer relationships. Analysis system 114 may generate an estimated revenue value for one or more users using, for example, a future revenue value model such as a CLV model. An estimated revenue value may represent a predicted future revenue (e.g., absolute or relative revenue indication, such as a monetary amount or a relative number on a scale) expected to be received from the user over a future time period (e.g., next 18 months, etc.). In some implementations, an estimated revenue value may be a CLV value and may represent a predicted revenue over a lifetime of the relationship with the customer (e.g., over a lifetime of the customer, over a time period in which the customer is expected to purchase items from the content provider, etc.). While various implementations discussed herein reference generating CLV values, it should be appreciated that the systems and methods described herein can be used to generate any representation of future revenue value for customers (e.g., expected future revenue over the next month, six months, year, five years, etc.).

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may comprise a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, content provider selling golf equipment may specify that they wish to place a content item (e.g., advertisement) on the sports page of an particular online newspaper.

Content management system 108 may also be configured to suggest a bid amount to a third-party content provider when a campaign is created or modified. In some implementations, the suggested bid amount may be based on aggregate bid amounts from the third-party content provider's peers (e.g., other third-party content providers that use the same or similar selection parameters as part of their campaigns). For example, a third-party content provider that wishes to place a content item on the sports page of an online newspaper may be shown an average bid amount used by other content provider on the same page. The suggested bid amount may facilitate the creation of bid amounts across different types of client devices, in some cases. In some implementations, the suggested bid amount may be sent to a third-party content provider as a suggested bid adjustment value. Such an adjustment value may be a suggested modification to an existing bid amount for one type of device, to enter a bid amount for another type of device as part of the same campaign. For example, content management system 108 may suggest that a third-party content provider increase or decrease their bid amount for desktop devices by a certain percentage, to create a bid amount for mobile devices.

Analysis system 114 may be configured to analyze data relating to user interactions with one or more items, such as resources (e.g., webpages, applications, etc.) associated with a content provider and/or paid or unpaid content items displayed within an interface in a resource (e.g., a search engine interface), and estimate an impact of one or more interactions on the predicted future revenue associated with customer relationships. Analysis system 114 may include one or more processors (e.g., any general purpose or special purpose processor), and may include and/or be operably coupled to one or more memories (e.g., any computer-readable storage media, such as a magnetic storage, optical storage, flash storage, RAM, etc.). In various implementations, analysis system 114 and content management system 108 may be implemented as separate systems or integrated within a single system (e.g., content management system 108 may be configured to incorporate some or all of the functions/capabilities of analysis system 114).

Analysis system 114 may include one or more modules (e.g., implemented as computer-readable instructions executable by a processor) configured to perform various functions of analysis system 114. Analysis system 114 may include a training module 116 configured to train a selected non-linear predictive model by determining model input parameters. Training module 116 may receive transaction data and calculate model parameters using a selected training model. In some implementations, models such as the Mean Likelihood Estimation (MLE) model may be used to determine parameters for the prediction module 118. For example, customer transaction data may be input to training module 116 and gamma parameters for a non-linear prediction model such as the Pareto/NBD model may be calculated using MLE.

Analysis system 114 may include a prediction module 118 configured to analyze data and infer an impact of one or more interactions on the future revenue value of customer relationships. Prediction module 118 may receive data and calculate estimated revenue values for one or more users. For example, prediction module 118 may receive customer-specific data as well as training parameters and customize a non-linear prediction model based on the training parameters for a group of users. Prediction module 118 may then apply the customer-specific data to the model for the group to generate predicted future revenue for each of the users in the group. In some implementations, prediction module 118 may generate a report providing information, such as a predicted future revenue value, on the impact of one or more interactions to the content provider.

In some implementations, analysis system 114 may include an intervention module 120 configured to implement one or more actions in response to estimated revenue values and/or future revenue impact values. In some implementations, intervention module 120 may be configured to cause content management system 108 to modify a bid for displaying one or more content items based on estimated revenue values, such as CLV values estimated by prediction module 118. For example, intervention module 120 may increase a bid to present a content item to a user to increase a number of interactions with the content item in response to determining the CLV for the user is high (e.g., to increase the value of a strong relationship) or low (e.g., to improve the value of a weak relationship). In some implementations, intervention module 120 may be configured to add one or more device identifiers to a remarketing list 130. In some implementations, remarketing list 130 may be used to initiate additional marketing contacts with the listed devices. In some such implementations, devices may be added to remarketing list 130 in response to intervention module 120 determining the device is associated with a low estimated future revanue, and remarketing list 130 may be used to market content items to the devices in an effort to reduce or counteract a negative impact of the previous interactions.

System 100 may include an analysis database 122. Analysis database 122 is shown to include training parameters 124, model outputs 126, user attributes 128, and remarketing list 130. Analysis database 122 may include other stored parameters or characteristics, and is not limited to the items shown in FIG. 1. In some implementations, analysis database 122 may include less than the items shown. Training parameters 124 may be stored in analysis database 122 by training module 116. In some implementations, training parameters 124 are the output of training module 116 and are input to prediction module 118.

Once training parameters 124 are used by prediction module 116, module 116 may produce model outputs 126. Model outputs 126 may be stored in analysis database 122, and may contain values such as CLV, probability of churn, and/or a future number of customer transactions. In some implementations, a prediction model used may produce other values such as customer or user attributes 128, which may be stored in analysis database 122. For example, attributes such as mean lifetime value, mean transaction value, etc. may be stored as user attributes 128. Stored data structures in analysis database 122 may be used in further analysis by analysis system 114 or any of its modules.

Figure 2:
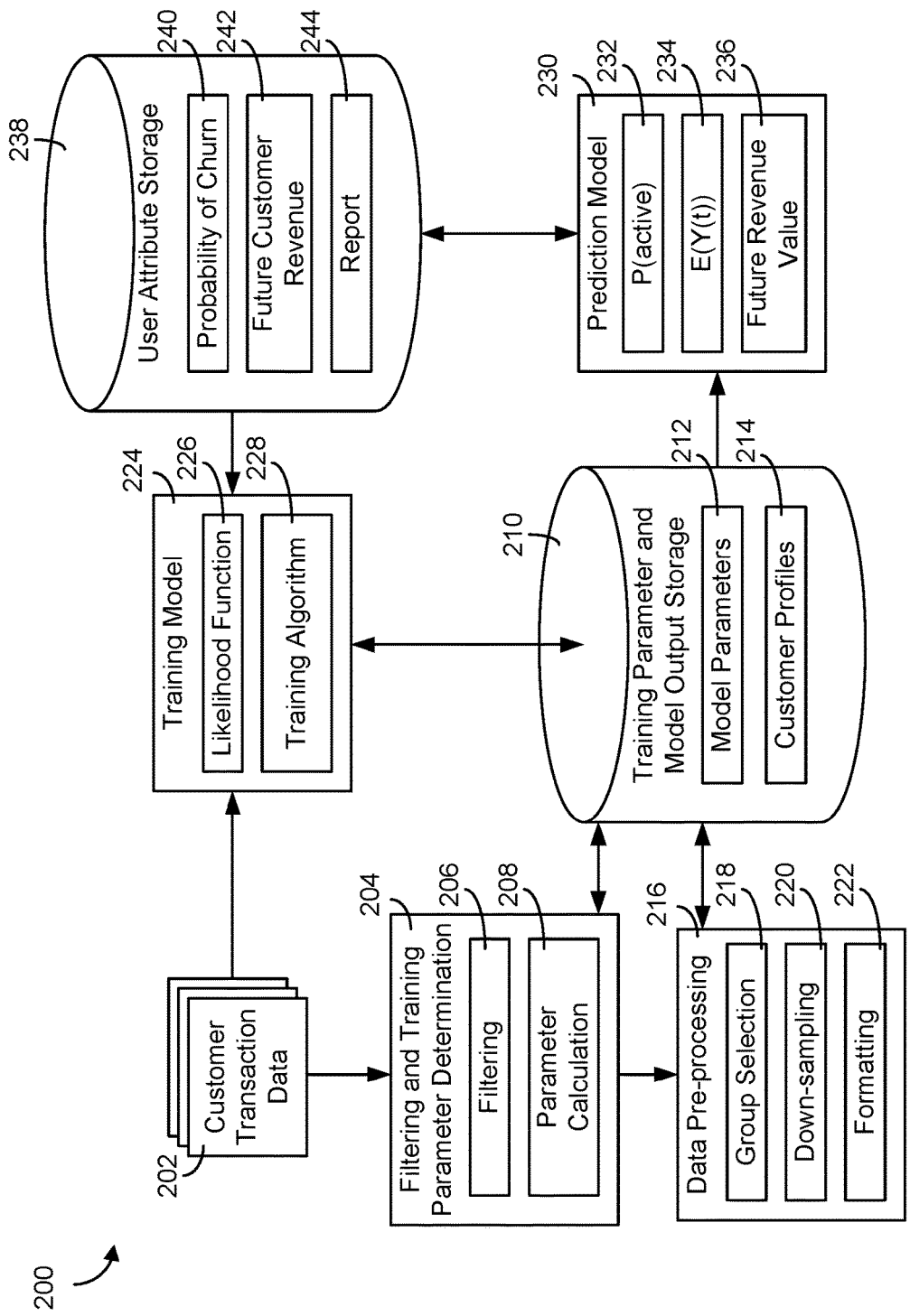
FIG. 2 is a block diagram of the analysis system and analysis database of FIG. 1 in detail according to an illustrative implementation.

Referring now to FIG. 2, and in brief overview, a block diagram of an analysis system 200 is shown according to an illustrative implementation. Analysis system 200 may be an implementation of analysis system 114 of FIG. 1. Customer transaction data 202 may be received by analysis system 200 and provided to filtering and training model parameter determination module 204. In some implementations, customer transaction data 202 is received as raw data, and may be organized into data structures for each unique customer. In other implementations, module 204 may read or retrieve customer transaction data 202 and customer profiles from a remote data storage system. Module 204 may read or retrieve customer transaction data 202 from data structures associated with each unique customer. Module 204 may read and record profile information in training parameter and model output storage 210. For example, module 204 may read profile information such as account id, log number, time zone, etc. from each unique customer's data structure and record the information in storage 210. In some embodiments, profile information is not recorded in storage 210, and a pointer to the location in the data structure may be stored. The profiles obtained are then filtered by filtering logic 206 of module 204. Filtering logic 206 may filter out profiles without enough transaction records and profiles with fake transaction records. Filtering and training parameter determination module 204 may be configured to record the filtered set of customer profiles in storage 210. In some implementations, the set of customer profiles is stored as a data structure (e.g., an array, a map, etc.) and may be more easily organized and manipulated than a table of raw data. In some implementations, the set of customer profiles may be stored as customer profiles 214, and may be modified by data pre-processing module 216. In some implementations, module 204 may record the filtered set of customer profiles as a set of identifiers for the profiles. Module 204 may not record the filtered set of customer profiles, and may simply pass the data structure containing the selected profiles to parameter calculation logic 208.

Parameter calculation logic 208 may calculate training model parameters such as a length of a customer group acquisition period. A group acquisition period may be a period of time during which a customer makes a first transaction and is acquired as a new customer. A group may later be generated from customers acquired during the group acquisition period. Parameter calculation logic 208 may be configured to calculate a calibration period. Transaction records for all users in the acquired group may be collected by accessing the data structures associated with each unique customer in the group during the calibration period. The records collected during the calibration period may be used to train the predictive model which may be implemented by prediction model module 230. In some implementations, parameter calculation logic 208 may be configured to calculate a sampling rate at which customer transaction data may be read. For example, 10% of the customer profiles may be included in the filtered data. The parameters calculated by logic 208 may be stored in storage 210. The parameters may be stored as model parameters 212 in storage 210. In some implementations, calculated parameters may be passed directly to data pre-processing module 216.

Data pre-processing module 216 is shown to include group selection logic 218 and down-sampling logic 220 according to an illustrative implementation. For each business analyzed, group selection logic 218 may select a group to use in the training model which may be implemented by training model module 224 and the prediction model which may be implemented by prediction model module 230. A group of customers may be selected if each customer was acquired and made a first transaction during the acquisition period determined by parameter calculation logic 208, in some implementations. Each group may be a collection of data structures representing unique customers. For example, if the acquisition period determined is the first two months of 2014, only data structures associated with customers who made his or her first purchase from the business analyzed during January or February of 2014 may be included in the group, in some implementations. Additional criteria may be defined for each group selected. In some implementations, a large number of data structures may be included in a group and may cause further calculation to become resource intensive. An increase in calculation time and resources needed is generally undesirable, and may decrease performance of a system running the analysis. A threshold amount of data structures may be determined, and if the number of data structures in a group exceeds the threshold value, down-sampling may occur through down-sampling logic 220. A percentage of data structures representing customers may be randomly chosen to be in a group in order to reach the determined threshold number of customers, in some implementations. The down-sampled group may be stored in storage 210. Filtering and training parameter determination module 204 and data pre-processing module 216 allow a complex, non-linear, predictive model to be divided into independent and distributed models. In some implementations, the down-sampled group may be passed to training model module 224.

Still referring to FIG. 2, training model module 224 is shown to include likelihood function logic 226 and training algorithm logic 228. Likelihood function logic 226 may be configured to calculate a likelihood of agreement of a selected predictive model with observed data. For example, likelihood function logic 226 may be configured for Maximum Likelihood Estimation (MLE). In some implementations, training model module 224 is configured to choose parameters for prediction model module 230 such that the likelihood function of likelihood function logic 226 is maximized. Training algorithm logic 228 may be used to compute a maximum for the likelihood function of likelihood function logic 226. For example, training algorithm logic 228 may be configured for the Broyden-Fletcher-Goldfarb-Shanno (BFGS) algorithm. Training model module 224 may iteratively choose predictive model parameters until likelihood function logic 226 calculates a maximum likelihood. In some implementations, stopping conditions to prevent excessive resource utilization may be enforced. For example, calculation may be halted if likelihood function logic 226 calculations a value within a threshold value of a maximum likelihood. The calculated prediction model parameters may be stored in storage 210. In some implementations, the calculated prediction model parameters may be passed to prediction model module 230.

Prediction model module 230 may be configured to calculate a probability that a customer is active (P(active)), an estimated future number of transactions (E(Y(t))), and a future revenue value for a certain time in the future. Prediction model module 230 may be based on any prediction models. In some implementations, prediction model module 230 may be based on a non-linear prediction model such as a covariance model or the Pareto/NBD model. Prediction model module 230 may include P(active) logic 232. P(active) logic 232 may compute the probability that a customer is active based on the prediction model parameters calculated by training model module 224. In some implementations, prediction model module 230 may include E(Y(t)) logic 234. E(Y(t)) logic 234 may be configured to calculate the estimated future number of transactions based on the prediction model parameters calculated by training model module 224. E(Y(t)) logic 234 may predict the number of transactions for a certain user at a future time T*. Prediction model module 230 may then use the calculated P(active) and E(Y(t)) for each customer to calculate a CLV. Prediction model module 230 may include future revenue value logic 236 to predict a future revenue value. Future revenue value logic 236 may be configured to calculate the future revenue value for a particular customer at a future time T*. In some implementations of system 200, a user attribute storage 238 may be included. The outputs of prediction model module 230 may be stored in a user attribute storage 238.

Outputs of prediction model module 230 may include probability of churn 240, future customer revenue 242, and a report 244 summarizing the results of prediction model module 230. The parameters stored in user attribute storage 238 may be passed to training model module 224 and the trained model may be applied to new customer group. For example, a model may be trained every month, a trained model may be applied every week, and the prediction model may be applied to calculate individual future revenue values, such as CLVs every day.

Referring still to FIG. 2, and in greater detail, modules 204, 216, 224, and 230 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. Modules 204, 216, 224, and 230 may be implemented as parts of one or more processors, and may not be separate stages. Storages 210 and 238 may be implemented as random access memory (RAM) or other dynamic storage devices, and may be coupled to the modules 204, 216, 224, or 230 for storing information, and instructions to be executed by the modules. Storages 210 and 238 can also be used for storing position information, temporary variables, or other intermediate information during execution of instructions by modules 204, 216, 224, or 230. Storages 210 and 238 may be implemented as read only memory (ROM) or other static storage devices for storing static information and instructions for modules 204, 216, 224, or 230. In some implementations, storages 210 and 238 may be implemented as solid state devices, magnetic disks, or optical disks for persistently storing information and instructions.

Figure 3A:
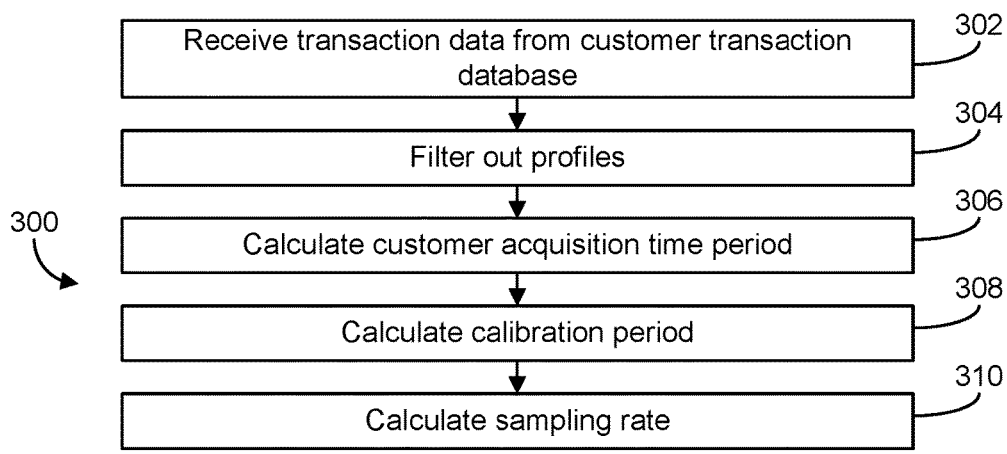
FIG. 3A is a flow diagram of a process for selecting data structures containing customer profile data and determining training parameters according to an illustrative implementation.

FIG. 3A is a flow diagram of a process 300 for selecting customer profiles and determining training model parameters according to an illustrative implementation. The training model parameters may be determined by filtering and training parameter determination module 204. In some implementations, the training model parameters may be determined by one or more processors of analysis system 114. Process 300 may be implemented utilizing a model such as MapReduce, and can be performed on data structures representing each unique customer.

Figure 3B:
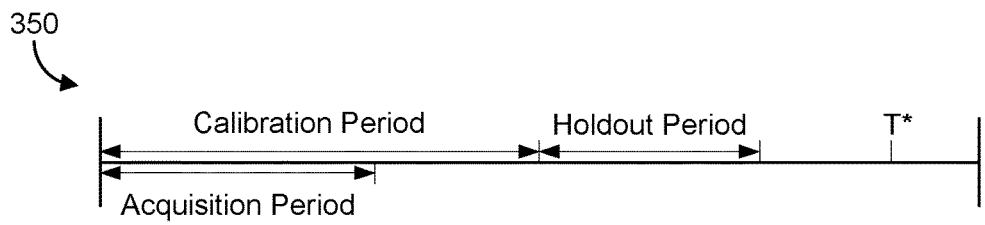
FIG. 3B is a diagram of different time periods used in the analysis system of FIG. 1 according to an illustrative implementation.

FIG. 3B shows a timeline 350 used in analysis processes in analysis system 114 according to an illustrative implementation. Timeline 350 is shown to include calibration period, acquisition period, holdout period, and future time T*. Timeline 350 is meant to be a visual representation of time periods and points in time which may be relevant to analysis system 114. Not every time period or every point in time shown in timeline 350 may be utilized or needed by analysis system 114 while performing analyses.

Referring now to FIGS. 1-3B, process 300 begins with step 302. Filtering and training parameter determination module 204 may receive transaction data from a customer transaction database 202 in step 302. Customer transaction database 202 may be a data structure containing data structures representing unique customers. For example, customer transaction database 202 may be a HashMap, in some implementations. Each value may be an identifier for an array containing customer profile information for the unique customer associated with the array. Customer transaction database 202 may be implemented as any data structure, and data structures representing customers may be any data structure. Customer transaction database 202 and the data structures representing each customer are not limited to the structures specifically enumerated. In some implementations, module 204 may receive transaction data from another database. The transaction data may be related to only one business. In some implementations, transaction data may relate to content items provided within a resource (e.g., within a content interface). The content items may include paid content items (e.g., paid items displayed within a search engine results interface and/or a different webpage, such as through the use of an auction process) and/or unpaid content items (e.g., unpaid search results displayed within a search engine results interface, unpaid links within a webpage, etc.). The content campaign may include one or more content items that the content provider wishes to have presented to user devices 104 by content management system 108. In some implementations, some of the content items may have one or more products and/or services associated with the content item. In some implementations, such content items may be designed to promote one or more particular products and/or services. In some implementations, some content items may be configured to promote the content provider, an affiliate of the content provider, a resource (e.g., website) of the content provider, etc. in general, and the products and/or services associated with the content item may be any products and/or services offered for sale through the content provider, affiliate, resource, etc. In some implementations, some content items may be configured to direct user devices 104 to resources configured to request information from a user, such as a lead form provided on a webpage.

Transaction data may include any type of data from which information about previous interactions of a user with resources and/or content presented therein can be determined. The interactions may be instances where impressions of a campaign content item have been displayed on the user device of the user, instances where the user clicked through or otherwise selected the content item, instances where the user converted (e.g., purchased a product/service as a direct or indirect result of an interaction with a campaign content item), etc.

In some implementations, transaction data may be result data associated with a resource visit or other user interaction with one or more content items of the content campaign. The result data may indicate whether the visit resulted in the purchase of one or more products or services, an identity of any products/services purchased, a value of any purchased products/services, etc. In various implementations, transaction data may reflect one or more of a variety of different types of user interactions. In some illustrative implementations, the interactions may include viewing a content item impression, clicking on or otherwise selecting a content item impression, viewing a video, listening to an audio sample, viewing a webpage or other resource, and/or any other type of engagement with a resource and/or content item displayed thereon. In some implementations, the interactions may include any sort of user interaction with content without regard to whether the interaction results in a visit to a resource, such as a webpage, associated with the content provider.

Filtering and training parameter determination module 204 may filter out certain customer profiles in step 304. Step 304 may be performed by filtering logic 206 of module 204. In some implementations, module 204 may filter out customer profiles which do not include enough transaction data or have incorrect or falsified data. For example, module 204 may filter out customer profiles with less than 3 days' worth of transactions. The threshold for the number of days' worth of data that a profile should have may be any number of days, and may be determined by a user of analysis system 114. Module 204 may filter out customer profiles identified as containing false data, such as impossibly or improbably large numbers of transactions. False or incorrect data for which a customer profile may be filtered out may be any kind of data, and may be defined by a user of analysis system 114. In some implementations, a user may provide input of filtering criteria through interaction with system 100 or any component of analysis system 114. From the filtered data, module 204 may calculate training model parameters such as a group acquisition time period 352. In some implementations, filtering out profiles may mean removing the pointer to the data structure containing the customer profile information.

In step 306, filter and training parameter determination module 204 may calculate a group acquisition time period 352. Step 306 may be performed by parameter calculation logic 208 of module 204. Group acquisition period 354 may represent the period of time during which new customers are acquired and included in a data set, or group, used to train a predictive model. In some implementations, any new customers after the acquisition period has ended are not considered. After this period, a group may be generated. Module 204 may define a start date and collect the number of transactions made on the start date by accessing data structures representing the customers. The collection may occur over a seven day period from the start date, over a fifteen day period from the start date, over a thirty day period from the start date, etc. The period from the start date may be defined by a user of system 114, may be any amount of time, and is not limited to increments of days. In some implementations, a minimum number and a maximum number of transactions may be defined by a user of analysis system 114. A multiplier may be defined to convert the number of transactions into the number of new customers who made a first transaction during the period from the start date. Filtering and training parameter determination module 204 may determine a group acquisition period 352 to be a period of time based on the shortest period of time which has a number of transactions greater than a predetermined threshold. For example, a group acquisition period 352 may be determined to be seven days, as seven days is the shortest period of time containing a number of transactions greater than a minimum number of transactions multiplied by a multiplier for converting the number of transactions into the number of new customers. Module 204 may determine other training model parameters, such as a calibration period 354.

Filtering and training parameter determination module 204 may estimate a calibration period 354 in step 308. Step 308 may be performed by parameter calculation logic 208 of module 204. A calibration period or an observation period may be a period during which customer transaction data is collected to train a predictive model. In some implementations, module 204 may determine calibration period 354 based on the lesser of a predetermined period of time and the period of time between the start date of step 306 and the present time. Calibration period 354 may be defined by a user of analysis system 114, and may be calculated based on additional factors.

Process 300 continues in step 310, when module 204 may determine a sampling rate for the data received from customer transaction database 202. Step 310 may be performed by parameter calculation logic 208 of module 204. The sampling rate may be the proportion of data structures containing customer profile data which are randomly chosen to be included in the groups. For example, a sampling rate may be determined to be 10% of a total set of 80000 data structures, such that 8000 data structures are included in the group. In some implementations, the sampling rate may be determined by a user of analysis system 114.

In addition to the training model parameters determined by filtering and training parameter determination module 204, timeline 350 is shown to include holdout period and future point in time T*. The holdout period may be a time period during which analysis system 114 continues to collect customer transaction data. Data collected during the holdout period may be used to compare with predicted values. Future point in time T* may be an arbitrary point in time for which the predicted CLV is calculated. A user of analysis system 114 may define the holdout period, future point in time T*, or any of the previously mentioned training model parameters, in any combination thereof. For example, a user may select 5000 data structures to be in a group with a calibration period of 60 days and a holdout period of 30 days. In another implementation, a user may choose to have 8500 data structures in a group with a sampling rate of 10%, a calibration period of 30 days, and a holdout period of 30 days. The determined training model parameters may then be stored in training parameter and model output storage 210. In some implementations, the determined training model parameters are passed directly to data pre-processing module 216.

Figure 4A:
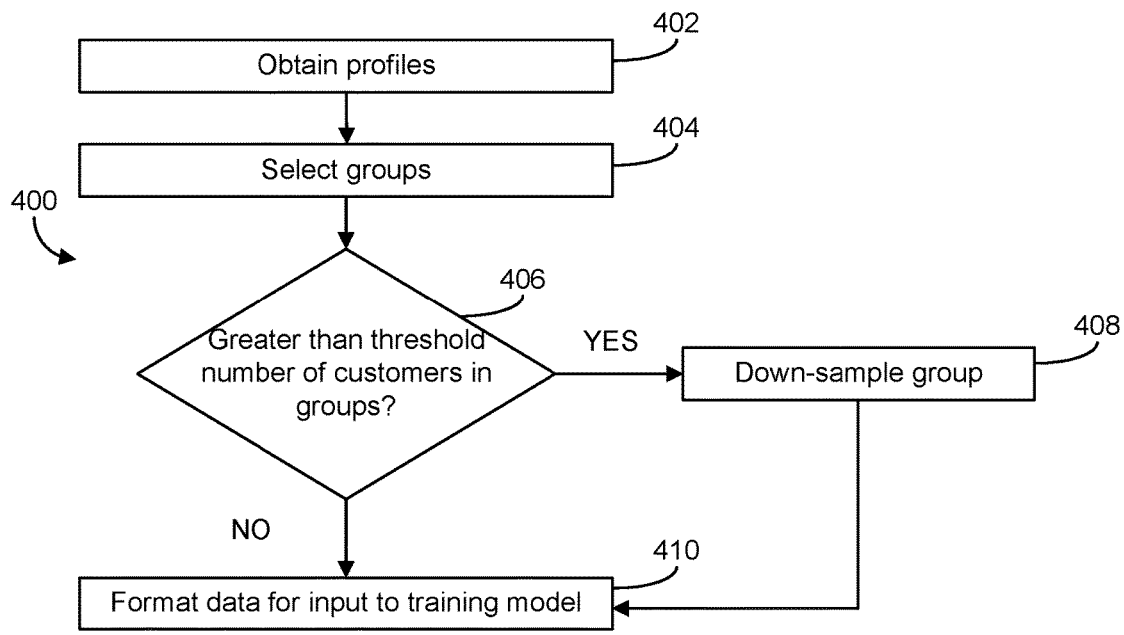
FIG. 4A is a flow diagram of a process for pre-processing transaction data from data structures representing customers associated with the selected data structures of FIG. 3A according to an illustrative implementation.

Referring now to FIG. 4A, a flow diagram of a process 400 for pre-processing data for use in training model module 224 is shown according to an illustrative implementation. Process 400 may be implemented by data pre-processing module 216. Process 400 may be implemented as a Mapper. Process 400 begins with step 402, in which data pre-processing module 216 receives customer profiles from filtering and training parameter determination module 204. Data pre-processing module 216 may receive data containing data structures representing customers. For example, data pre-processing module 216 may receive a heap of pointers to locations in memory of each data structure representing a customer in the group. In some implementations, module 216 may read in the customer profiles from customer transaction database 202 by accessing the data structures. Module 216 may clean up and merge customer profiles and transaction data during step 402. Next, a group of data structures representing customers may be selected.

Figure 4B:
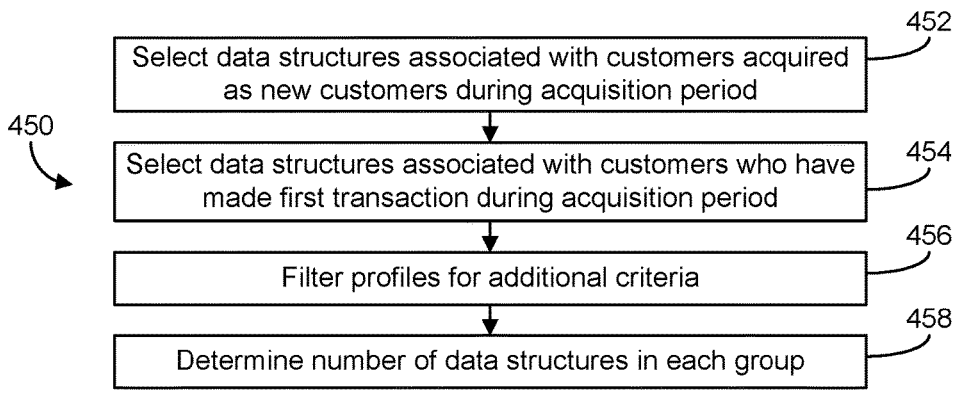
FIG. 4B is a flow diagram of a process for selecting groups of data structures according to an illustrative implementation.

In step 404, data pre-processing module 216 may split the customer base. Referring now to FIG. 4B, a flow diagram of a process 450 for selecting a group is shown according to an illustrative implementation. Process 450 may provide more detail on step 404, and may be performed by group selection logic 218 of data pre-processing module 216. Process 450 begins with step 452, in which module 216 selects data structures representing customers acquired as new customers during the group acquisition period 352. In step 454, module 216 further selects data structures representing customers who have made a first transaction during acquisition period 352. For example, if acquisition period 352 was January 2015 to February 2015, only data structures representing customers who made his or her first purchase with the business are included in the group.

Additional criteria may be defined for the group such as acquisition channel, verticals, customer demographics, customer location, etc. For instance, one group may be defined as all data structures containing information regarding customers from North America who have made a first transaction during acquisition period 352. Data pre-processing module 216 may filter for any additional criteria in step 456.

After the customers in the group are determined, module 216 may count the number of data structures representing customers in the group in step 458. In some implementations, no more than a threshold number of data structures may be needed to train the predictive model. For example, for some purposes, no more than 50000 data structures may be needed to train a predictive model. The threshold value of 50000 is meant to be an illustrative figure, and may be defined by a user of analysis 114. The threshold number of data structures in a group may be determined automatically by analysis system 114. If there are significantly more data structures in the group than the threshold value, additional steps may be taken by data pre-processing module 216.

Once the group has been selected, process 400 continues in step 406. Data pre-processing module 216 may determine whether the number of data structures in the selected group of step 404 is greater than a predefined threshold number of data structures representing customers. If the number of data structures in the selected group is greater than the threshold number of data structures, process 400 continues with step 408. Data pre-processing module 216 may randomly choose a percentage of data structures to be in the group, or down-sample the group.

Down-sampling the group may prevent training model module 224 from using a prohibitively large amount of memory and/or other processing resources, such as processing cycles used to generate training parameters. Prohibitively large may be defined by a user of analysis system 114. In some implementations, a threshold may be defined for the amount of memory used by training model module 224. Using a large amount of memory slows the operation of analysis 114, requires a large amount of resources, and impairs performance. If there are significantly more data structures in the group than a threshold number of data structures in a group, a down-sampling step may be performed by down-sampling logic 220 of data pre-processing module 216. For example, if there are significantly more than 50000 data structures in a group, data pre-processing module 216 may down-sample the group. The down-sampling may preserve the ratios of characteristics present in the population of data structures representing customer. In some implementations, data pre-processing module 216 may keep every nth data point. Down-sampling may be performed through many processes, and is not limited to those explicitly enumerated. After down-sampling, or if the number of customers in the group is not significantly more than a threshold number of customers as determined in step 406, process 400 continues with step 410.

Once all transaction data from all customers from a first transaction to a transaction made right before the calibration cutoff time, i.e., T, is obtained, the data may be formatted for use by the training model module 224. In some implementations, input formatting may be performed by formatting logic 222 of data pre-processing module 216 in step 410. The formatted data may be the form of a vector that stores input in either training model module 224 or prediction model module 230. In some implementations the input into the training module is a customer's historic transaction data. For example, if the training model selected is MLE, the input into the training model may be in the format of (X=x, t, T). X may be a random variable or function for a customer's purchase count; x may be the number of transactions made by a customer before the calibration cutoff time; t may be the time of a last purchase before the calibration cutoff time made by a customer, relative to the customer's first purchase date; and T may be the time demarcating the end of the observation period, i.e. the "age" of the customer until calibration cutoff time. In some implementations, the output of training model module 224 and the input to prediction model module 230 may also be a customer's historic transaction data. For example, if the predictive model selected is the Pareto/NBD model, the output of training model module 224 may be in the format of (X=x, t, T, m), where m may represent the average value of transaction made by the customer.

Figure 5:
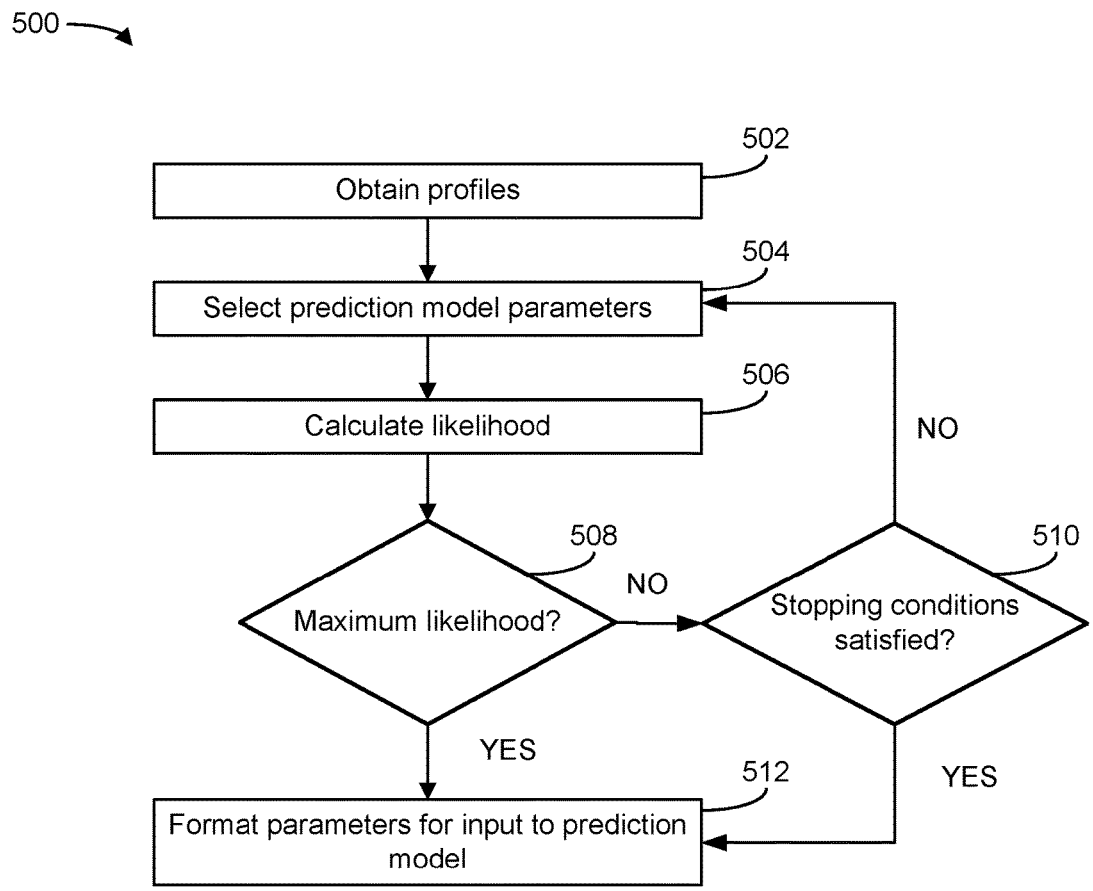
FIG. 5 is a flow diagram of a process for training a non-linear prediction model according to an illustrative implementation.
Figure 6:
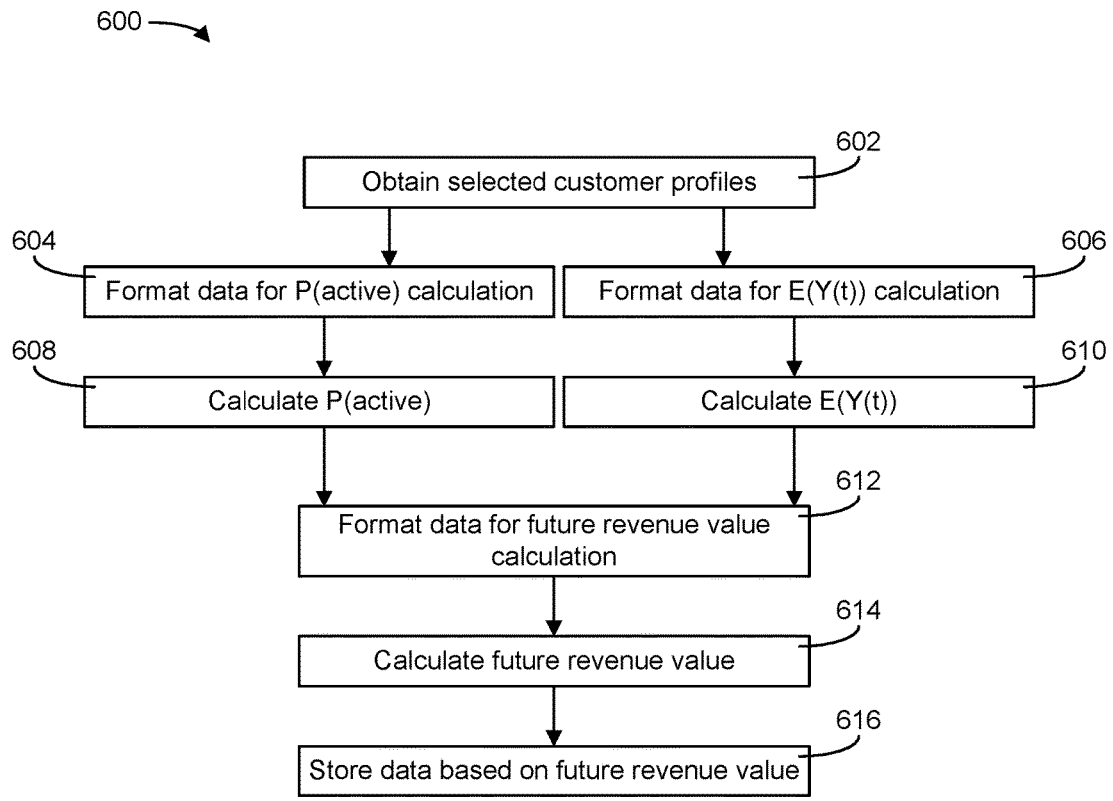
FIG. 6 is a flow diagram of a process for predicting a future revenue value using the non-linear prediction model of FIG. 5

Referring now to FIG. 5, a flow diagram detailing a process 500 for training a predictive model by determining model parameters is shown according to an illustrative implementation. Any non-linear model (covariance-based models, Pareto/NBD, etc.) may be used by analysis system 114. In some implementations, the Pareto/NBD is selected; FIGS. 5 and 6 detail the application of the methods, systems, and computer-readable storage media of this disclosure to the Pareto/NBD model as an illustrative implementation.

Training model module 224 may be implemented utilizing a reducer process, such as MapReduce. All modules of analysis system 114 may be implemented as models and implementations associated with data structures, in some implementations. The use of data structures may ease automation and distribution of prediction modeling in analysis system 114. In some distributed implementations, multiple training model modules may be used, and each module 224 may obtain all customer recency, frequency, and monetary (RFM) data from one group. In some implementations, one model is trained per customer group. In some implementations, the training model module runs every month and trains one model for one profile or one customer group (i.e. one model per month)—one set of (r,α,s,β) is saved per model. The Maximum Likelihood Estimation (MLE) model may be used to train a Pareto/NBD model, and is described in the disclosure as an illustrative implementation. In some implementations, other methods may be used to train a Pareto/NBD model. MLE is a method of estimating the parameters of a statistical model, given data, and corresponds to many well-known estimation methods in statistics. Pareto/NBD models a customer's purchase rate and death rate as separate gamma distributions: one set of gamma parameters (r, (r, α) is associated with a customer's purchase rate and one set (s, β) is associated with a customer's death rate. If the Pareto/NBD model is used, the output of a training model may be an estimation of the four gamma parameters (r, α, s, β) used in the model. The goal of training model module 224 when using MLE may be to choose (r, α, s, β) such that the following log likelihood function is increased (e.g., maximized):

$$LL(r, \alpha, s, \beta) = \sum_{i=1}^{N} \ln[L(r, \alpha, s, \beta) | X_i = x_i, t_{x_i}, T_i)]$$

The likelihood function for a randomly chosen customer with history (X=x, $t_x$, T) is:

$$L(r, \alpha, s, \beta) | X = x, t_x, T) =$$

$$\frac{\Gamma(r+x)\alpha^r \beta^s}{\Gamma(r)} \times \left\{ \frac{1}{(\alpha+T)^{r+x}(\beta+T)^s} + \left(\frac{s}{r+s+x}\right) A_0 \right\}$$

where for $\alpha \geq \beta$:

$$A_0 = \frac{{}_2F_1\left(r+s+x, s+1; r+s+x+1; \frac{\alpha-\beta}{\alpha+t_x}\right)}{(\alpha+t_x)^{r+s+x}} -$$

$$\frac{{}_2F_1\left(r+s+x, s+1; r+s+x+1; \frac{\alpha-\beta}{\alpha+T}\right)}{(\alpha+T)^{r+s+x}}$$

and for $\alpha \leq \beta$:

$$A_0 = \frac{{}_2F_1\left(r+s+x, s+1; r+s+x+1; \frac{\beta-\alpha}{\beta+t_x}\right)}{(\beta+t_x)^{r+s+x}} -$$

$$\frac{{}_2F_1\left(r+s+x, s+1; r+s+x+1; \frac{\beta-\alpha}{\beta+T}\right)}{(\beta+T)^{r+s+x}}$$

where ${}_2F_1(\bullet)$ is the Gaussian hypergeometric function:

$${}_2F_1(a, b; c, z) = \sum_{j=0}^{\infty} \frac{(a)_j (b)_j}{(c)_j} \frac{z^j}{j!}, c \neq 0, -1, -2, \ldots$$

The Gaussian hypergeometric function is a power series and does not have a closed-form derivative—maximizing the log likelihood function may be done iteratively by computing a numeric derivative at each iteration using an adaptive central difference algorithm. In some implementations, the Broyden-Fletcher-Goldfarb-Shanno (BFGS) algorithm may be used to approximate a numeric derivative for the Gaussian hypergeometric function. The BFGS algorithm is a quasi-Newton method which builds up an approximation of the second derivative of a function using the difference between successive gradient vectors. A class of hill-climbing training, the BFGS algorithm is scalable for large applications and seeks a stationary point of a function. The log likelihood function may be evaluated for all customers in the selected group at each iteration. The algorithm converges when the magnitude of the gradient vector becomes smaller than a predefined threshold value.

Process 500 begins with step 502, in which training model module 224 may receive customer profiles from data pre-processing module 216. In some implementations, training model module 224 may read customer parameters from training parameter and model output storage 210 by accessing the data structures representing each customer. Storage 210 may contain pointers to the data structures representing each customer. Module 224 may then select initial gamma parameters for prediction model module 230 in step 504. For example, training model module 224 may initialize with gamma parameters (0.5, 1.0, 0.5, 1.0). Module 224 may then calculate a log likelihood using the above identified equation in step 506. For example, the log likelihood may be −9595.0 for the previously selected gamma parameters. In some implementations, values of the gamma parameters may be calculated for use in the next iteration. For example, the next gamma parameters may be (0.5533, 10.5777, 0.6062, 11.6681). Referring now to FIGS. 2 and 5, the log likelihood may be calculated by likelihood function logic 226 of training model module 224. Once an iteration is complete and a log likelihood has been calculated, training algorithm logic 228 of training model module 224 may determine whether a maximum likelihood has been reached in step 508.

In some implementations, stopping conditions may be imposed in step 510 if a target (e.g., maximum) likelihood has not been reached. Non-convex, non-linear objective functions may define the stopping conditions. These stopping conditions may be based on factors such as the amount of time the algorithm takes to converge, and for training model module 224 to return estimated prediction model parameters. For example, training model module 224 may be stopped if computation time exceeds a threshold amount of time determined by a user of analysis system 114. The threshold amount of time may be any time, for example, half an hour, 10 hours, etc. and may depend on the resources available and/or a user-defined compromise between accuracy and resource efficiency. The increased resource efficiency improves the operation of the system on which the training model is run, and improves the field of CLV estimation. The entire training process may be automated, and may eliminate the need for manual training, input, and supervision of portions, or even the entirety of CLV estimation system 200. If no target (e.g., maximum) likelihood has been reached and no stopping condition has been satisfied, process 500 returns to step 504 to select new gamma parameters to continue iteration. In some implementations, training model module 224 uses the calculated gamma parameters for the next iteration. In some implementations, training model module 224 may apply a function to the previous gamma parameters to generate new parameters. In some implementations, training model module 224 may select new parameters based on input from a user of analysis system 114.

If a maximum likelihood has been reached, or if a stopping condition has been satisfied, process 500 may continue with step 512. The final gamma parameters may then be formatted for input to prediction model module 224. In some implementations, the final gamma parameters are stored in training parameter and model output storage 210. In some implementations, the final gamma parameters are simply passed to prediction model module 230.

A prediction model provides an estimation of how CLV changes in the future based on a customer's previous behavior. The model may be used for predicting future events, but is limited in its ability to predict events such as black swan events, or events that are unprecedented or unexpected at the point in time it occurs. In an illustrative implementation, the model described in the present disclosure is based on customer behavior and the exponential function of the Pareto/NBD model. Inputs to the model may include gamma parameters, such as those calculated by training model module 224. In an illustrative implementation, the gamma parameters to the Pareto/NBD model may be calculated for groups of customers. Model parameters can be changed at the customer level for each group to further tailor each model to its respective group. In some implementations, model parameter changes may be made by adding, removing, or modifying values in the data structure representing the customer.

The model can be as granular as is desired, and its level of detail may depend on computation requirements and restrictions. The granularity of the model may be defined based on input from a user of analysis system 114. Users may prefer to use less granular groups to use less data processing power. The distributed and parallel processing of the models improves the efficiency of the system on which the calculations are being run. Customer demographics, customer data, and the gamma parameter inputs to the model are periodically updated for new customer data collected. Traditionally, the Pareto/NBD is a processing intensive model which requires input and modification by a data scientist. The present disclosure describes automatically training, tuning, and selecting groups. The distributed and automated process provides a more accurate and scalable model which can be used for large numbers of businesses with differing numbers of customer bases.

The predictive model may estimate the future revenue of users in a variety of different ways in various implementations. In some implementations, a future revenue value model may use historical information to estimate a future revenue value such as a CLV. For instance, a CLV model may use an average revenue per customer over a particular historical time period to estimate CLV. In some implementations, the CLV model may use an average revenue per customer for a set of customers sharing one or more common characteristics to estimate CLV. In some implementations, an average historical revenue over a particular time period may be used to predict a revenue over a future time period. In various implementations, predictive statistical methods such as linear regression, Bayesian inference, negative binomial distribution, and/or other predictive methods may be used to infer future customer revenue from historical data.

Any non-linear model (covariance-based models, Pareto/NBD, etc.) may be used by analysis system 114. In some implementations, the chosen model is the Pareto/NBD model and the following disclosure continues to discuss the application of the methods, systems, and computer-readable storage media of this disclosure to the Pareto/NBD model solely for illustrative purposes.

The Pareto/NBD model is accurate for both aggregate and individual use cases. Aggregate use case—trained model can be used to predict a different group in the same profile. Individual use case—predicted CLV per customer has low margin of error. Different profiles have different behaviors. Black Friday has a bigger impact on retail profiles, different profiles should have different acquisition period, calibration period, sampling rate, etc. The model can be trained with 5k to 10k customers in each group, in some implementations.

Referring now to FIG. 6, a process 600 for using a non-linear predictive model to calculate probability of churn, estimated number of transactions, and CLV is shown according to an illustrative implementation. The model used simulates individual customers' purchase behavior to give an estimated CLV for each customer. A trained model can be applied to any customer in the same group. The Pareto/NBD model uses a negative binomial distribution (NBD) to model a customer's purchase rate—the number of transactions made by a customer over time; and a Pareto distribution to model a customer's death rate or P(churn) of a customer. To account for population heterogeneity, the Pareto/NBD model uses two independent gamma distributions: each individual customer has his or her own purchase rate and death rate.

In some implementations, a highly accurate approximation of the objective function is utilized to reduce failures when processing large amounts of data. For example, the Pareto/NBD contains an exponential function which reaches large values that may become difficult to process as the number of customers used in the model grows. In some implementations, an approximation of the Pareto/NBD model may substitute a function for the exponential function which does not grow to such large values.

The prediction model may output a predicted number of transactions made by a customer over time, CLV over time (in dollars), and a probability of churn. In some implementations, the model applies to any customer of the same group with a sufficient length of purchase history: for example, at least 3-5 days' worth of history. In some implementations, the trained model may be applied to a new customer group or the same group of customers from a different period of time. The updating and continuous application of the model allows users to account for seasonality in customer behavior.

Referring now to FIGS. 2 and 6, process 600 begins with step 602, in which a prediction model, which may be implemented by prediction model module 230, obtains customer profiles from the selected group by accessing the data structures representing each customer. In some implementations, prediction model module 230 may obtain the profiles from training parameter and model output storage 210. In some implementations, prediction model module 230 may read selected customer profiles from customer transaction database 202 by accessing the data structures representing the customers. For example, module 230 may follow pointers to the locations in memory of each data structure containing customer profile and transaction data. In some implementations, prediction model module 230 may obtain customer profiles from user input. The methods of obtaining and locations of the selected customer profiles are not limited to those explicitly enumerated above. Once the customer data has been obtained, process 600 may continue with prediction model module 230 performing steps 604 and 606 in parallel. In some implementations, steps 604 and 606 may not be performed in parallel. The ordering of the steps of any of the processes in the present disclosure are not meant to be wholly limiting.

In steps 604 and 606, prediction model module 230 may format data for calculation of customer attributes. In some implementations, prediction model module 230 may format the data into an RFM entry. The purchase history of each customer in the selected group may include a time of a last transaction relative to the first transaction (recency, $t_x$); how many times the customer has made purchases (frequency, x); and an average transaction amount (monetary). Process 600 may continue with steps 608 and 610. In some implementations, steps 608 and 610 are performed in parallel. In some implementations, steps 608 and 610 are not performed in parallel. The ordering of the steps of any of the processes in the present disclosure are not meant to be wholly limiting.

In step 608, prediction model module 230 may calculate the probability that a customer is active, P(active), or 1−P(churn). P(churn) is modeled by the Pareto distribution of the Pareto/NBD model. P(active) may be calculated using the following equation:

$$P(\text{active} \mid r, \alpha, s, \beta, X = x, t_x, T) = \left\{1 + \left(\frac{s}{r+s+x}\right)(\alpha+T)^{r+x}(\beta-T)^s A_0\right\}^{-1}$$

where the $A_0$ function takes different forms based on values of $\alpha$ and $\beta$. In some implementations, step 608 may be performed by P(active) logic 232 of predictive model module 230. P(active) may be stored in training parameter and model output storage 210. In some implementations, P(active) may be stored in customer attribute storage 238. P(active) may be stored as a value in the data structure representing the customer associated with the calculated P(active) value. In some implementations, P(active) may simply be used in the next steps of process 600 and then discarded.

In step 610, prediction model module 230 may calculate the expected number of transactions for a customer, E(Y(t)), represented by the NBD portion of the Pareto/NBD model. E(Y(t)) may be calculated using on the following equation:

$$E(Y(t) \mid X = x, t_x, T, r, \alpha, s, \beta) = \frac{(r+x)(\beta+T)}{(\alpha+T)(s-1)}\left[1 - \left(\frac{\beta+T}{\beta+T+t}\right)^{s-1}\right] \times P(\text{active} \mid r, \alpha, s, \beta, X = x, t_x, T)$$

In some implementations, step 612 may be performed by E(Y(t)) 234 of prediction model module 230. E(Y(t)) may be stored in training parameter and model output storage 210. In some implementations, E(Y(t)) may be stored in customer attribute storage 238. E(Y(t)) may be stored as a value in the data structure representing the customer associated with the calculated E(Y(t)) value. In some implementations, E(Y(t)) may simply be used in the next steps of process 600 and then discarded.

Using the calculated values of P(active) and E(Y(t)), prediction model module 230 may estimate CLV using the following equation:

$$E(Y(t) \mid X=x,t_x,T,r,\alpha,s,\beta)*\text{average transaction value}$$

In some implementations, step 614 may be performed by Future customer revenue logic 236 of prediction model module 230. The calculated CLV may be stored in customer attribute storage 238. In some implementations, CLV may be stored in training parameter and model output storage 210.

Process 600 ends with step 616, in which a report may be generated summarizing the output of the prediction model. In some implementations, the report is not generated. In some implementations, the output of the prediction model is stored in customer attribute storage 238 for use in a next cycle of training model module 224.

The mean of the Pareto/NBD model, calculated using the following function of time:

$$E[X(t) \mid r, \alpha, s, \beta] = \frac{r\beta}{\alpha(s-1)}\left[1 - \left(\frac{\beta}{\beta+1}\right)^{s-1}\right]$$

The mean of the model may be plotted to evaluate the accuracy of the model against actual data collected during holdout period 356. In some implementations, a cumulative number of transactions may be plotted to evaluate the accuracy of the model against actual data collected during holdout period 356.

Optionally, there may be an aggregation and evaluation step (e.g., implemented as a MapReduce) of the data structures representing the selected customers in each group. The estimated future revenue value, in some implementations, a CLV, from the prediction model is compared with the actual future revenue value. The two future revenue values may be compared in the holdout period calculated by the profile selection module. Error statistics are generated and analyzed. Error margin when predicting individual customer future revenue value during a holdout period—absolute errors, and percentage of error over total number of transactions. These errors are recorded and may be stored in storage 210 or 230. In some implementations, these errors are simply passed to training model module 224 for use in the next run of training model module 224.

Figure 7:
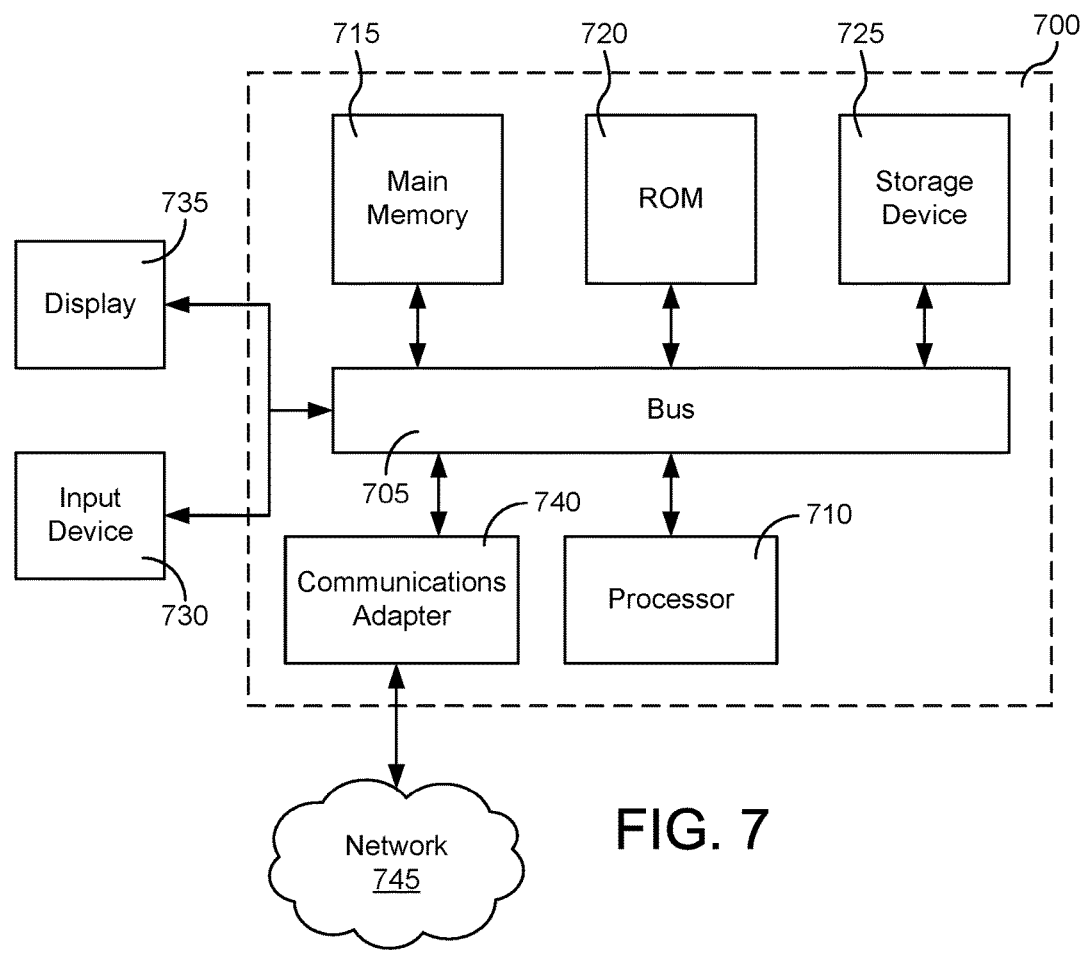
FIG. 7 is a block diagram of a computing system according to an illustrative implementation.

FIG. 7 illustrates a depiction of a computer system 700 that can be used, for example, to implement an illustrative user device 104, an illustrative content management system 108, an illustrative content provider device 106, an illustrative analysis system 114, and/or various other illustrative systems described in the present disclosure. The computing system 700 includes a bus 705 or other communication component for communicating information and a processor 710 coupled to the bus 705 for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 710 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another implementation, the input device 730 has a touch screen display 735. The input device 730 can include a cursor control, such as a mouse, a trackball, or cursor direction keys, for communicating direction information and command selections to the processor 710 and for controlling cursor movement on the display 735.

In some implementations, the computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example, semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    accessing, by one or more processors, a plurality of data structures, each data structure representing a unique customer and storing a set of customer-specific characteristics including a time of customer acquisition;
    segregating, by the one or more processors, the plurality of data structures into a plurality of groups based on the stored customer acquisition times and responsive to a target amount of data structures for each group;
    inputting, by the one or more processors, the customer-specific characteristics of each of the customers in the groups into a training model;
    training, by the one or more processors, at least a first non-linear prediction model and a second non-linear prediction model by transforming, by the one or more processors for each of the groups, at least some of the customer-specific characteristics stored by each one of the data structures in the group into a set of prediction model parameters using the training model, the set of prediction model parameters comprising a first set of prediction model parameters of a first group of the plurality of groups for the first non-linear prediction model and a second set of prediction model parameters of a second group of the plurality of groups for the second non-linear prediction model;
    transforming, by at least one first processor of the one or more processors, the customer-specific characteristics of each data structure in the first group into a respective future revenue value for each data structure using the first non-linear prediction model based on the first set of prediction model parameters associated with the first group; transforming, by at least one second processor of the one or more processors, the customer-specific characteristics of each data structure in the second group into a respective future revenue value for each data structure using the second non-linear prediction model based on the second set of prediction model parameters associated with the second group, at least a portion of the future revenue values for the first and second groups calculated in parallel by the at least one first processor and the at least one second processor; and
    storing, by the one or more processors in a memory element, data based on the calculated future revenue values.

2. The method of claim 1, wherein the target amount of data structures is a target number of data structures.

3. The method of claim 1, wherein the target amount of data structures is a target range of data structures.

4. The method of claim 1, further comprising:
    identifying, by the one or more processors, groups in which the number of data structures is larger than the target amount of data structures; and
    trimming, by the one or more processors, the identified groups to generate the training model parameters by applying one or more population reduction rules to reduce an amount of data structures in the reduced population to no greater than the target amount of data structures.

5. The method of claim 1, wherein segregating the plurality of data structures further comprises at least one of:
    restricting the plurality of data structures to data structures representing customers determined to have been acquired as a new customer during a predefined period of time; or
    restricting the plurality of data structures to data structures representing customers determined to have made a transaction during the predefined period of time.

6. The method of claim 5, further comprising determining the period of time based on a number of transactions made by the customers represented by the plurality of data structures.

7. The method of claim 6, wherein the period of time is a shortest period of time in which the number of transactions made by the customers represented by the plurality of data structures is greater than a predetermined threshold number of transactions.

8. The method of claim 1, wherein the prediction model is based on a Pareto model.

9. The method of claim 1, wherein transforming the customer-specific characteristics stored by each one of the data structures in the group into a set of prediction model parameters comprises:
    iteratively selecting, by the one or more processors, one of a plurality of test sets of training model parameters;
    calculating, by the one or more processors, an output value of a likelihood function associated with the training model for each of the test sets; and
    selecting a test set of training model parameters as the training model parameters for the group from among the plurality of test sets based on the output values.

10. The method of claim 9, wherein transforming the customer-specific characteristics stored by each one of the data structures in the group into the set of prediction model parameters further comprises:
    comparing, by the one or more processors, the output value of the likelihood function to a predefined goal value by calculating a difference between the output value and the goal value; and stopping further iteration when the difference between the output value and the goal value is smaller than a predefined threshold value.

11. A system, comprising:
a plurality of processors operably connected to a plurality of memories and configured to:
access a plurality of data structures, each data structure representing a unique customer and storing a set of customer-specific characteristics including a time of customer acquisition;
segregate the plurality of data structures into a plurality of groups based on the stored customer acquisition times and responsive to a target amount of data structures for each group;
input the customer-specific characteristics of each of the customers in the groups into a training model;
train at least a first non-linear prediction model and a second non-linear prediction model by transforming, for each of the groups, at least some of the customer-specific characteristics stored by each one of the data structures in the group into a set of prediction model parameters using the training model, the set of prediction model parameters comprising a first set of prediction model parameters of a first group of the plurality of groups for the first non-linear prediction model and a second set of prediction model parameters of a second group of the plurality of groups for the second non-linear prediction model;
wherein at least one first processor of the plurality of processors is configured to transform the customer-specific characteristics of each data structure in the first group into a respective future revenue value for each data structure using the first non-linear prediction model based on the first set of prediction model parameters associated with the first group;
wherein at least one second processor of the plurality of processors is configured to transform the customer-specific characteristics of each data structure in the second group into a respective future revenue value for each data structure using the second non-linear prediction model based on the second set of prediction model parameters associated with the second group, at least a portion of the future revenue values for the first and second groups calculated in parallel by the at least one first processor and the at least one second processor; and
store in a memory element, data based on the calculated future revenue values.

12. The system of claim 11, wherein the target amount of data structures is a target range of data structures.

13. The system of claim 11, wherein the plurality of processors are configured to:
identify groups in which the number of data structures is larger than the target amount of data structures; and
trim the identified groups to generate the training model parameters by applying one or more population reduction rules to reduce an amount of data structures in the reduced population to no greater than the target amount of data structures.

14. The system of claim 11, wherein the plurality of processors are further configured to:
restrict the plurality of data structures to data structures representing customers determined to have been acquired as a new customer during a predefined period of time; or
restrict the plurality of data structures to data structures representing customers determined to have made a transaction during the predefined period of time.

15. The system of claim 14, wherein the plurality of processors are further configured to determine the period of time based on a number of transactions made by the customers represented by the plurality of data structures.

16. The system of claim 15, wherein the period of time is a shortest period of time in which the number of transactions made by the customers represented by the plurality of data structures is greater than a predetermined threshold number of transactions.

17. The system of claim 11, wherein the plurality of processors are further configured to:
iteratively select one of a plurality of test sets of training model parameters;
calculate an output value of a likelihood function associated with the training model for each of the test sets; and
select a test set of training model parameters as the training model parameters for the group from among the plurality of test sets based on the output values.

18. The system of claim 17, wherein the plurality of processors are further configured to:
compare the output value of the likelihood function to a predefined goal value by calculating a difference between the output value and the goal value; and
stop further iteration when the difference between the output value and the goal value is smaller than a predefined threshold value.

19. One or more computer-readable storage media having instructions stored thereon that, when executed by a plurality of processors, cause the processors to execute operations comprising:
accessing, a plurality of data structures, each data structure representing a unique customer and storing a set of customer-specific characteristics including a time of customer acquisition;
segregating the plurality of data structures into a plurality of groups based on the stored customer acquisition times and responsive to a target amount of data structures for each group by at least one of:
restricting the plurality of data structures to data structures representing customers determined to have been acquired as a new customer during a predefined period of time; or
restricting the plurality of data structures to data structures representing customers determined to have made a transaction during the predefined period of time;
inputting the customer-specific characteristics of each of the customers in the groups into a training model;
iteratively selecting one of a plurality of test sets of training model parameters;
calculating an output value of a likelihood function associated with a training model;
selecting a test set of training model parameters as the training model parameters for each group from among the plurality of test sets based on the output values;
training, by one or more processors of the plurality of processors, at least a first non-linear prediction model and a second non-linear prediction model by transforming, by the one or more processors for each of the groups, at least some of the customer-specific characteristics stored by each one of the data structures in the group into a set of prediction model parameters using the selected training model parameters, the set of prediction model parameters comprising a first set of prediction model parameters of a first group of the plurality of groups for the first non-linear prediction model and a second set of prediction model parameters of a second group of the plurality of groups for the second non-linear prediction model;

transforming, by at least one first processor of the plurality of processors, the customer-specific characteristics of each data structure in the first group into a respective future revenue value for each data structure using the first non-linear prediction model based on a first set of prediction model parameters associated with the first group;

transforming, by at least one second processor of the plurality of processors, the customer-specific characteristics of each data structure in the second group into a respective future revenue value for each data structure using the second non-linear prediction model based on the second set of prediction model parameters associated with the second group, at least a portion of the future revenue values for the first and second groups calculated in parallel by the at least one first processor and the at least one second processor; and storing, by the one or more processors in a memory element, data based on the calculated future revenue values.

20. The computer-readable storage media of claim 19, the operations further comprising:

comparing the output value of the likelihood function to a predefined goal value by calculating a difference between the output value and the goal value; and stopping further iteration when the difference between the output value and the goal value is smaller than a predefined threshold value.

* * * * *